United States Patent
Muttik et al.

(10) Patent No.: US 6,907,396 B1
(45) Date of Patent: Jun. 14, 2005

(54) DETECTING COMPUTER VIRUSES OR MALICIOUS SOFTWARE BY PATCHING INSTRUCTIONS INTO AN EMULATOR

(75) Inventors: Igor Muttik, Berkhamsted (GB); Duncan V. Long, Tring (GB)

(73) Assignee: Networks Associates Technology, Inc., Santa Clara, CA (US)

( * ) Notice: Subject to any disclaimer, the term of this patent is extended or adjusted under 35 U.S.C. 154(b) by 1157 days.

(21) Appl. No.: 09/586,671

(22) Filed: Jun. 1, 2000

(51) Int. Cl.$^7$ ................................................. G06F 9/44
(52) U.S. Cl. ......................... 703/22; 703/26; 713/156; 717/134
(58) Field of Search ............................ 703/22, 26, 27; 713/156, 200, 201; 717/134, 168

(56) References Cited

U.S. PATENT DOCUMENTS

| | | | | |
|---|---|---|---|---|
| 5,619,698 A | * | 4/1997 | Lillich et al. | 717/168 |
| 6,014,702 A | * | 1/2000 | King et al. | 709/227 |
| 6,035,405 A | * | 3/2000 | Gage et al. | 713/201 |
| 6,112,304 A | * | 8/2000 | Clawson | 713/156 |
| 6,275,938 B1 | * | 8/2001 | Bond et al. | 713/200 |
| 2003/0177485 A1 | * | 9/2003 | Waldin et al. | 717/169 |

* cited by examiner

Primary Examiner—Thai Phan
(74) Attorney, Agent, or Firm—Zilka-Kotab, PC; Christopher J. Hamaty

(57) ABSTRACT

One embodiment of the present invention provides a system for emulating computer viruses and/or malicious software that operates by patching additional program instructions into an emulator in order to aid in detecting a computer virus and/or malicious software within suspect code. During operation, the system loads a first emulator extension into the emulator. This first emulator extension includes program instructions that aid in the process of emulating the suspect code in order to detect a computer virus and/or malicious software. The system also loads the suspect code into an emulator buffer. Next, the system performs an emulation using the first emulator extension and the suspect code. This emulation is performed within an insulated environment in a computer system so that the computer system is insulated from malicious actions of the suspect code. During this emulation, the system determines whether the suspect code is likely to exhibit malicious behavior. In one embodiment of the present invention, loading the first emulator extension into the emulator involves loading the first emulator extension into the emulator buffer within the emulator. In this embodiment, performing the emulation involves emulating the program instructions that comprise the first emulator extension.

37 Claims, 2 Drawing Sheets

DETECTING COMPUTER VIRUSES OR MALICIOUS SOFTWARE BY PATCHING INSTRUCTIONS INTO AN EMULATOR

BACKGROUND

1. Field of the Invention

The present invention relates to systems for detecting computer viruses and malicious software. More specifically, the present invention relates to a method and an apparatus for emulating computer viruses or other malicious software that operates by patching additional instructions into an emulator in order to aid in the process of detecting, decrypting or disinfecting code containing a computer virus or other malicious software.

2. Related Art

Malicious software, such as a computer virus, can enter a computer system in a number of ways. It can be introduced on a disk or a CD-ROM that is inserted into the computer system. It can also enter from a computer network, for example, within an email message.

If malicious software is executed by a computer system, it can cause a number of problems. The software can compromise security, by stealing passwords; by creating a "back door" into the computer system; or by otherwise accessing sensitive information. The software can also cause damage to the computer system, for example, by deleting files or by causing the computer system to fail.

Some types of malicious programs can be easily detected using simple detection techniques, such as scanning for a search string. However, this type of detection process can be easily subverted by converting a malicious algorithm into program code in different ways.

Another approach to detecting malicious software is to run a program on a real machine while attempting to intercept malicious actions. This technique, which is known as "behavior blocking," has a number of disadvantages. In spite of the attempt to intercept malicious actions, the program may nevertheless cause harm to the computer system. Furthermore, the behavior blocking mechanism typically cannot view an entire log of actions in making a blocking determination. Hence, the behavior blocking mechanism may make sub-optimal blocking decisions, which means harmless programs may be blocked or harmful programs may be allowed to execute.

Yet another approach to detecting malicious software is to "emulate" suspect code within an insulated environment in a computer system so that the computer system is protected from malicious actions of the suspect code.

One disadvantage to emulation is that it is almost impossible to provide complete emulation for all program instructions, all operating system calls and operating system environments that may be accessed by a piece of code being emulated without replicating the entire operating system in the process. Hence, in practice, emulators are typically able to emulate only commonly occurring program instructions and system calls.

This problem can be overcome by updating and recompiling an emulator to implement new system calls and new program instructions as different pieces of malicious software are encountered that make use of these new system calls and new program instructions. However, doing so can lead to logistical problems in keeping emulation programs up to date.

Another problem with current emulators is that they cannot deal with conflicting emulator environments. For example, one virus may be triggered by a system call returning the year 1999, while another virus is triggered by the same system call returning the year 2000.

What is needed is a method and an apparatus for emulating suspect code that can be easily reconfigured to accommodate new program instructions, system calls and emulation environments.

SUMMARY

One embodiment of the present invention provides a system for emulating computer viruses and/or malicious software that operates by patching additional program instructions into an emulator in order to aid in detecting a computer virus and/or malicious software within suspect code. During operation, the system loads a first emulator extension into the emulator. This first emulator extension includes program instructions that aid in the process of emulating the suspect code in order to detect a computer virus and/or malicious software. The system also loads the suspect code into an emulator buffer within a data space of a computer system. Next, the system performs an emulation using the first emulator extension and the suspect code. This emulation is performed within an insulated environment in the computer system so that the computer system is insulated from malicious actions of the suspect code. During this emulation, the system determines whether the suspect code is likely to exhibit malicious behavior.

In one embodiment of the present invention, loading the first emulator extension into the emulator involves loading the first emulator extension into the emulator buffer within the emulator. In this embodiment, performing the emulation involves emulating the program instructions that comprise the first emulator extension.

In one embodiment of the present invention, emulating the program instructions that comprise the first emulator extension causes the emulator to examine the suspect code looking for patterns that indicate that the suspect code is likely to exhibit malicious behavior.

In one embodiment of the present invention, emulating the program instructions that comprise the first emulator extension causes the program instructions within the first emulator extension to facilitate emulation of the suspect code.

In one embodiment of the present invention, prior to loading the first emulator extension into the emulator buffer, the system emulates the suspect code without using the first emulator extension.

In one embodiment of the present invention, the system additionally loads a second emulator extension into the emulator, and performs a second emulation using the second emulator extension and the suspect code. In a variation on this embodiment, the first emulator extension implements a first emulation environment that conflicts with a second emulation environment that is implemented by the second emulator extension.

In one embodiment of the present invention, loading the first emulator extension involves loading the first emulator extension from a database containing a plurality of different emulator extensions.

In one embodiment of the present invention, the first emulator extension includes code for decrypting an encrypted computer virus.

In one embodiment of the present invention, if a computer virus or other malicious software is detected within the suspect code, the system additionally disinfects the suspect code.

In one embodiment of the present invention, the first emulator extension facilitates emulating a non-standard computer instruction opcode.

In one embodiment of the present invention, the first emulator extension facilitates emulating an uncommonly used operating system call.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

Computer System

Figure 1:
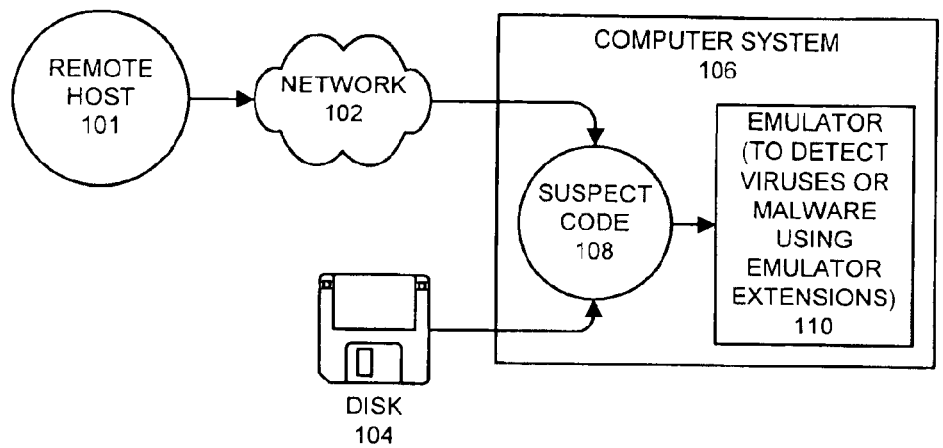
FIG. 1 illustrates a computer system in accordance with an embodiment of the present invention.

FIG. 1 illustrates a computer system 106 in accordance with an embodiment of the present invention. Computer system 106 may include any type of computer system, including, but not limited to, a computer system based on a microprocessor, a mainframe computer, a digital signal processor, a personal organizer, a device controller, and a computational engine within an appliance.

Computer system 106 can receive suspect code 108 (which can potentially be malicious) from a number of different sources. Suspect code 108 may be introduced into computer system 106 by a remote host 101 across a network 102. For example, suspect code 108 may be included within an electronic mail (email) message from remote host 101 to computer system 106. Remote host 101 can include any entity that is capable of sending suspect code 108 across network 102 to computer system 106. Network 102 can include any type of wire or wireless communication channel capable of coupling together computing nodes. This includes, but is not limited to, a local area network, a wide area network, or a combination of networks. In one embodiment of the present invention, network 102 includes the Internet.

Suspect code 108 may additionally be introduced into computer system 106 by encoding suspect code 108 on a computer-readable storage medium, such as disk 104, and introducing disk 104 into computer system 106. Note that disk 104 can generally include any type of computer-readable storage medium, such as a magnetic disk, a magnetic tape and a CD-ROM.

Before executing suspect code 108, computer system 106 uses emulator 110 to analyze suspect code 108. Emulator 110 analyzes suspect code 108 by executing emulator code 203 and emulator extensions 204 as is described below with reference to FIGS. 2 and 3.

Emulator Structure

Figure 2:
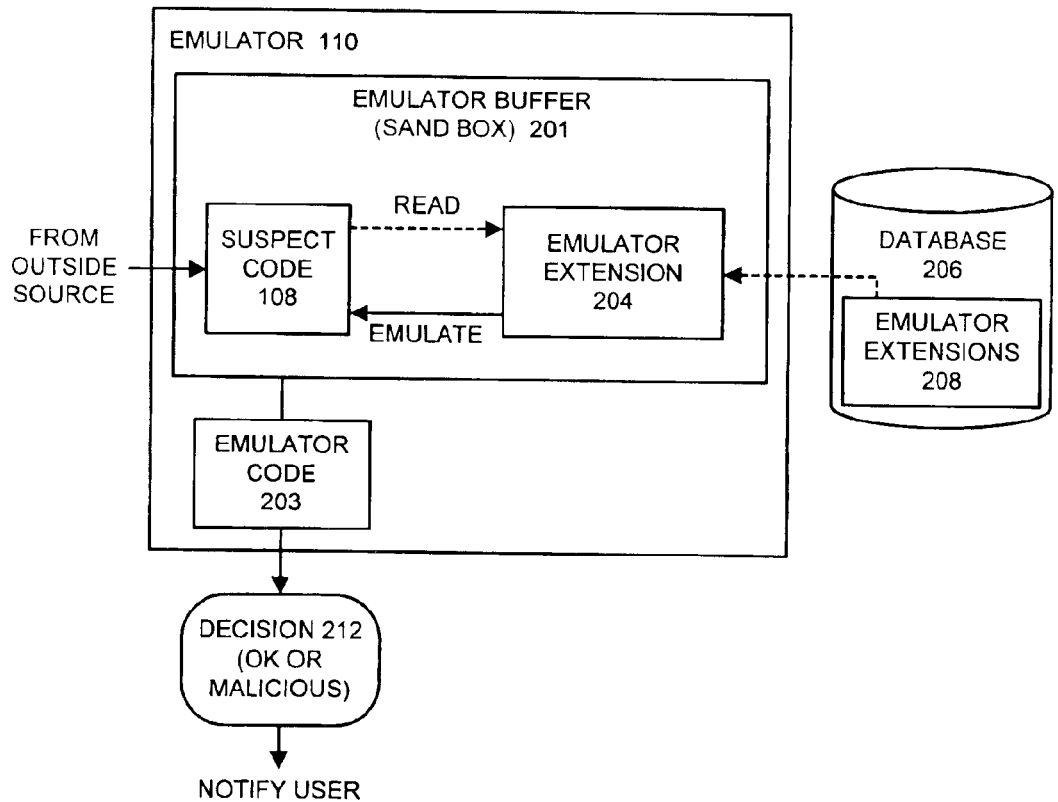
FIG. 2 illustrates the internal structure of an emulator for emulating and analyzing code for malicious behavior in accordance with an embodiment of the present invention.

FIG. 2 illustrates the internal structure of an emulator 110 for emulating and analyzing suspect code 108 for malicious behavior in accordance with an embodiment of the present invention. Emulator 110 includes emulator code 203, emulator buffer 201 and database 206. Emulator code 203 includes code to perform the emulation.

Emulator buffer 201 is a protected region of memory (also known as a sandbox or a working space) in which suspect code 108 is stored and emulated. Emulator buffer 201 stores suspect code 108 as well as emulator extension 204. Emulator buffer 201 and emulator code 203 are designed so that while suspect code 108 that is executing within emulator buffer 201, suspect code 108 cannot damage or compromise computer system 106. Emulator extension 204 includes additional program instructions that assist emulator code 203 in the emulation process.

Note that emulator buffer 201 is not within the program space of computer system 106, but is instead in the data space. Hence, instructions within emulator extension 204 must themselves be emulated by emulator code 203. In an alternative embodiment of the present invention, emulator extension 204 is loaded as a patch into the program space of computer system 106. In this alternative embodiment, emulator extension can be executed directly on computer system 106.

Emulator extension 204 is retrieved from database 206, which contains a plurality of emulator extensions 208, which can be successively loaded into emulator buffer 201 during the emulation process. Database 206 can include any type of volatile or non-volatile memory or storage device that can be used to store emulator extensions 208. Database 206 can reside within computer system 106, or alternatively, can reside on an external database server that is separate from computer system 106.

During the emulation process, emulator extension 204 can read suspect code 108 looking for patterns indicating the suspect code 108 contains a virus or other type of malicious software. Alternatively, emulator extension 204 can set up an environment that is conducive to emulating suspect code 108. For example, emulator extension 204 can configure the system to emulate uncommonly used system calls or opcodes. This enables emulator code 203 and/or emulator extension 204 to determine of suspect code 108 exhibits malicious behavior. Emulator code 203 (working with emulator extension 204) ultimately outputs a decision 212 indicating whether suspect code 108 is malicious or not.

Note that emulator extension 204 can be emulated in a number of different ways. (1) Emulator extension 204 can be emulated as part of suspect code 108 by patching the emulator extension 204 into suspect code 108, possibly replacing, overlapping or overwriting portions of suspect code 108. In this case, the location where the patching occurs is defined in the database 206. (2) Emulator extension 204 can be executed before the suspect code 108 is executed, which enables emulator extension 204 to set up the environment that emulator extension 204 is responsible for handling. After this environment is set up, emulator extension 204 passes control suspect code 108. (3) Emulator extension 204 can replace suspect code 108 entirely. In this case, the suspect code 108 is not emulated at all, and emulator extension 204 produces decision 212 after analyzing the suspect code 108 as data. (4) Emulator extension 204 can be emulated after the suspect code 108 is emulated. This allows emulator extension 204 to analyze the results of running the suspect code 108 in order to produce decision 212.

Process of Emulation

Figure 3:
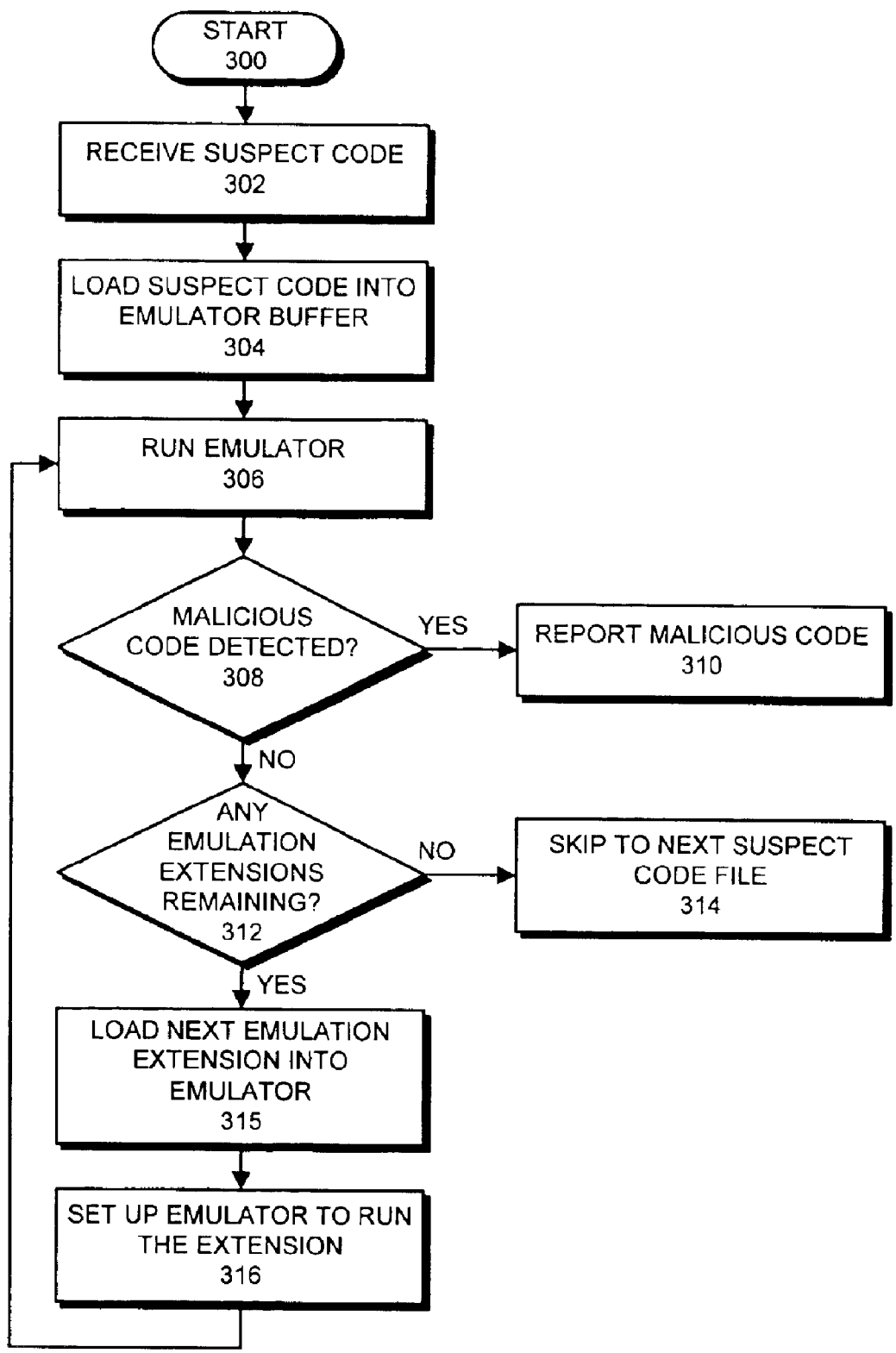
FIG. 3 is a flow chart illustrating the process of emulating and analyzing code for malicious behavior using emulator extensions in accordance with an embodiment of the present invention.

FIG. 3 is a flow chart illustrating the process of emulating and analyzing code for malicious behavior using emulator extensions in accordance with an embodiment of the present invention. The system starts by receiving suspect code 108 from one of a number of possible sources as is described above with reference to FIG. 1 (step 302). The system loads this suspect code into emulator buffer 201 (step 304).

Next, the system runs emulator 110 (step 306). This causes suspect code 108 to be examined and/or emulated by emulator code 203. During the emulation process, the system determines whether or not suspect code 108 contains code that is likely to exhibit malicious behavior (step 308). If so, the system reports the malicious code to a system user or system administrator (step 310).

If no malicious code is detected, the system determines if there are any emulator extensions remaining in database 206 that have not already been used (step 312). If not, the system proceeds to the next file containing suspect code to repeat the entire process (step 314).

Otherwise, if there are emulator extensions remaining, the system loads the next emulator extension into emulator 110 (step 315). In one embodiment of the present invention, this involves loading emulator extension 204 into emulator buffer 201 within emulator 110. In an alternative embodiment, this involves loading emulator extension 204 into the program space of computer system 106 so that it can work in concert with emulator code 203 in performing a subsequent emulation.

Next, the system sets up emulator 110 to run emulator extension 204 (step 316). This may involve configuring emulator code 203 to initially run emulator extension 204. Next, the system returns to step 306 to continue with the emulation process using the new emulator extension.

Note that by using multiple emulator extensions it is possible to deal with conflicting emulator environments. For example, a first emulator extension can configure emulator 110 to detect a virus that is triggered by a system call returning the year 1999, while a second emulator extension can configure emulator 110 to detect a virus that is triggered by the same system call returning the year 2000.

The foregoing descriptions of embodiments of the invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for emulating computer viruses and/or malicious software that operates by patching additional program instructions into an emulator in order to aid in detecting a computer virus and/or malicious software within suspect code, the method comprising:

receiving the suspect code;

loading the suspect code into an emulator buffer within a data space of a computer system;

loading a first emulator extension into the emulator, the emulator capable of performing an emulation using emulation code, the first emulator extension including program instructions that aid in the process of emulating the suspect code in order to detect a computer virus and/or malicious software, wherein the program instructions of the first emulator extension are additional beyond that associated with the emulator code, for assisting the emulator code in the emulation by patching the additional program instructions into the emulator in order to aid in detecting the computer virus and/or malicious software within the suspect code;

performing the emulation using the first emulator extension, the emulation code and the suspect code, the emulation being performed within an insulated environment in the computer system so that the computer system is insulated from malicious actions of the suspect code; and determining whether the suspect code is likely to exhibit malicious behavior based upon the emulation.

2. The method of claim 1, wherein loading the first emulator extension into the emulator includes loading the first emulator extension into the emulator buffer within the emulator; and wherein performing the emulation includes emulating the program instructions that comprise the first emulator extension.

3. The method of claim 2, wherein emulating the program instructions that comprise the first emulator extension causes the emulator to examine the suspect code looking for patterns that indicate that the suspect code is likely to exhibit malicious behavior.

4. The method of claim 2, wherein emulating the program instructions that comprise the first emulator extension causes the program instructions within the first emulator extension to facilitate emulation of the suspect code.

5. The method of claim 1, further comprising emulating the suspect code prior to loading the first emulator extension into the emulator buffer.

6. The method of claim 1, further comprising:

loading a second emulator extension into the emulator; and performing a second emulation using the second emulator extension and the suspect code.

7. The method of claim 6, wherein the first emulator extension and the second emulator extension provide support for conflicting emulator environments.

8. The method of claim 1, wherein loading the first emulator extension involves loading the first emulator extension from a database containing a plurality of different emulator extensions.

9. The method of claim 1, wherein the first emulator extension includes code for decrypting an encrypted computer virus and other encrypted malicious code.

10. The method of claim 1, further comprising if a computer virus or other malicious software is detected within the suspect code, disinfecting the suspect code.

11. The method of claim 1, wherein the first emulator extension facilitates emulating a non-standard computer instruction opcode.

12. The method of claim 1, wherein the first emulator extension facilitates emulating an uncommonly used operating system call.

13. The method of claim 1, wherein if the computer virus and/or malicious software is not detected, it is determined if there are any remaining emulator extensions remaining in a database that have not already been used, wherein if there are any remaining emulator extensions remaining in the database that have not already been used, a next emulator extension is loaded into the emulator to repeat the emulation using the next emulator extension.

14. A computer-readable storage medium storing instructions that when executed by a computer cause the computer to perform a method for emulating computer viruses and/or malicious software that operates by patching additional program instructions into an emulator in order to aid in detecting a computer virus and/or malicious software within suspect code, the method comprising:

receiving the suspect code;

loading the suspect code into an emulator buffer within a data space of a computer system;

loading a first emulator extension into the emulator, the emulator capable of performing an emulation using emulation code, the first emulator extension including program instructions that aid in the process of emulating the suspect code in order to detect a computer virus and/or malicious software, wherein the program instructions of the first emulator extension are additional beyond that associated with the emulator code, for assisting the emulator code in the emulation by patching the additional program instructions into the emulator in order to aid in detecting the computer virus and/or malicious software within the suspect code;

performing the emulation using the first emulator extension, the emulation code and the suspect code, the emulation being performed within an insulated environment in the computer system so that the computer system is insulated from malicious actions of the suspect code; and determining whether the suspect code is likely to exhibit malicious behavior based upon the emulation.

15. The computer-readable storage medium of claim 14, wherein loading the first emulator extension into the emulator includes loading the first emulator extension into the emulator buffer within the emulator; and wherein performing the emulation includes emulating the program instructions that comprise the first emulator extension.

16. The computer-readable storage medium of claim 15, wherein emulating the program instructions that comprise the first emulator extension causes the emulator to examine the suspect code looking for patterns that indicate that the suspect code is likely to exhibit malicious behavior.

17. The computer-readable storage medium of claim 15, wherein emulating the program instructions that comprise the first emulator extension causes the program instructions within the first emulator extension to facilitate emulation of the suspect code.

18. The computer-readable storage medium of claim 14, wherein the method further comprises emulating the suspect code prior to loading the first emulator extension into the emulator buffer.

19. The computer-readable storage medium of claim 14, wherein the method further comprises:

loading a second emulator extension into the emulator; and performing a second emulation using the second emulator extension and the suspect code.

20. The computer-readable storage medium of claim 19, wherein the first emulator extension and the second emulator extension provide support for conflicting emulator environments.

21. The computer-readable storage medium of claim 14, wherein loading the first emulator extension involves loading the first emulator extension from a database containing a plurality of different emulator extensions.

22. The computer-readable storage medium of claim 14, wherein the first emulator extension includes code for decrypting an encrypted computer virus and other encrypted malicious code.

23. The computer-readable storage medium of claim 14, wherein if a computer virus or other malicious software is detected within the suspect code, the method further comprises disinfecting the suspect code.

24. The computer-readable storage medium of claim 14, wherein the first emulator extension facilitates emulating a non-standard computer instruction opcode.

25. The computer-readable storage medium of claim 14, wherein the first emulator extension facilitates emulating an uncommonly used operating system call.

26. An apparatus that emulates computer viruses and/or malicious software that operates by patching additional program instructions into an emulator in order to aid in detecting a computer virus and/or malicious software within suspect code, the apparatus comprising:

a loading mechanism that is configured to load the suspect code into an emulator buffer within a data space of a computer system;

wherein the loading mechanism is additionally configured to load a first emulator extension into the emulator, the emulator capable of performing an emulation using emulation code, the first emulator extension including program instructions that aid in the process of emulating the suspect code in order to detect a computer virus and/or malicious software, wherein the program instructions of the first emulator extension are additional beyond that associated with the emulator code, for assisting the emulator code in the emulation by patching the additional program instructions into the emulator in order to aid in detecting the computer virus and/or malicious software within the suspect code;

an emulation mechanism that is configured to perform the emulation using the first emulator extension, the emulation code and the suspect code, the emulation being performed within an insulated environment in the computer system so that the computer system is insulated from malicious actions of the suspect code; and a determination mechanism that is configured to determine whether the suspect code is likely to exhibit malicious behavior based upon the emulation.

27. The apparatus of claim 26, wherein the loading mechanism is configured to load the first emulator extension into the emulator buffer within the emulator; and wherein the emulation mechanism is configured to emulate the program instructions that comprise the first emulator extension.

28. The apparatus of claim 27, wherein emulating the program instructions that comprise the first emulator extension causes the emulation mechanism to examine the suspect code looking for patterns that indicate that the suspect code is likely to exhibit malicious behavior.

29. The apparatus of claim 27, wherein emulating the program instructions that comprise the first emulator extension causes the emulation mechanism to facilitate emulation of the suspect code.

30. The apparatus of claim 26, wherein the emulator is configured to emulate the suspect code prior to loading the first emulator extension into the emulator buffer.

31. The apparatus of claim 26, wherein the loading mechanism is additionally configured to:

load a second emulator extension into the emulator; and to perform a second emulation using the second emulator extension and the suspect code.

32. The apparatus of claim 31, wherein the first emulator extension and the second emulator extension provide support for conflicting emulator environments.

33. The apparatus of claim 26, wherein the loading mechanism is configured to load the first emulator extension from a database containing a plurality of different emulator extensions.

34. The apparatus of claim 26, wherein the first emulator extension includes code for decrypting an encrypted computer virus and other encrypted malicious code.

35. The apparatus of claim 26, further comprising a disinfecting mechanism that is configured to disinfect the suspect code if a computer virus or other malicious software is detected within the suspect code.

36. The apparatus of claim 26, wherein the first emulator extension is configured to facilitate emulating a non-standard computer instruction opcode.

37. The apparatus of claim 26, wherein the first emulator extension is configured to facilitate emulating an uncommonly used operating system call.

* * * * *